United States Patent [19]

Riseman et al.

[11] 3,894,917

[45] July 15, 1975

[54] ELECTROCHEMICAL MEASURING SYSTEMS AND METHOD OF MEASURING IONIC STRENGTH IN A FLOW STREAM

[75] Inventors: John H. Riseman, Cambridge; Martin Frant, Newton, both of Mass.; James W. Ross, Reno, Nev.

[73] Assignee: Orion Research Incorporated, Cambridge, Mass.

[22] Filed: June 16, 1971

[21] Appl. No.: 153,667

[52] U.S. Cl. ........ 204/1 T; 204/195 R; 204/195 M; 204/195 L; 204/195 F
[51] Int. Cl.² ........................................ G01N 27/46
[58] Field of Search ............. 204/1 T, 195 F, 195 R, 204/195 M, 195 L

[56] References Cited
UNITED STATES PATENTS

| | | | |
|---|---|---|---|
| 1,388,613 | 8/1921 | Simsohn | 204/195 |
| 2,768,135 | 10/1956 | Adelson | 204/195 |
| 2,886,496 | 5/1959 | Eckfeldt | 204/1 T |
| 3,151,052 | 9/1964 | Arthur et al. | 204/195 |
| 3,573,174 | 3/1971 | Caro | 204/195 |

FOREIGN PATENTS OR APPLICATIONS

| | | | |
|---|---|---|---|
| 1,058,763 | 6/1959 | Germany | 204/195 |

OTHER PUBLICATIONS

Stanley E. Manahan, Analytical Chemistry, vol. 42, No. 1, pp. 128–129, (1970).

Harold Jacobson, Analytical Chemistry, vol. 38, No. 13, pp. 1951–1954, (1966).

R. A. Rapp et al., "Techniques of Metals Research, vol. 4, Physicochemical Measurements in Metal Research, Part 2, pp. 132–134, (1970).

Richard A. Durst, "Ion–Selective Electrodes", p. 371, (1969).

*Primary Examiner*—G. L. Kaplan

[57] ABSTRACT

A system for making electrochemical measurements in a flow stream, which system employs reagent addition to a sample stream and a pair of ion-sensing electrodes responsive respectively to the ion of interest in the sample stream and a tag ion in the reagent stream. The electrodes are so disposed in the system that the latter becomes relatively insensitive to variations in the flow rate of either or both the sample and reagent streams.

15 Claims, 1 Drawing Figure

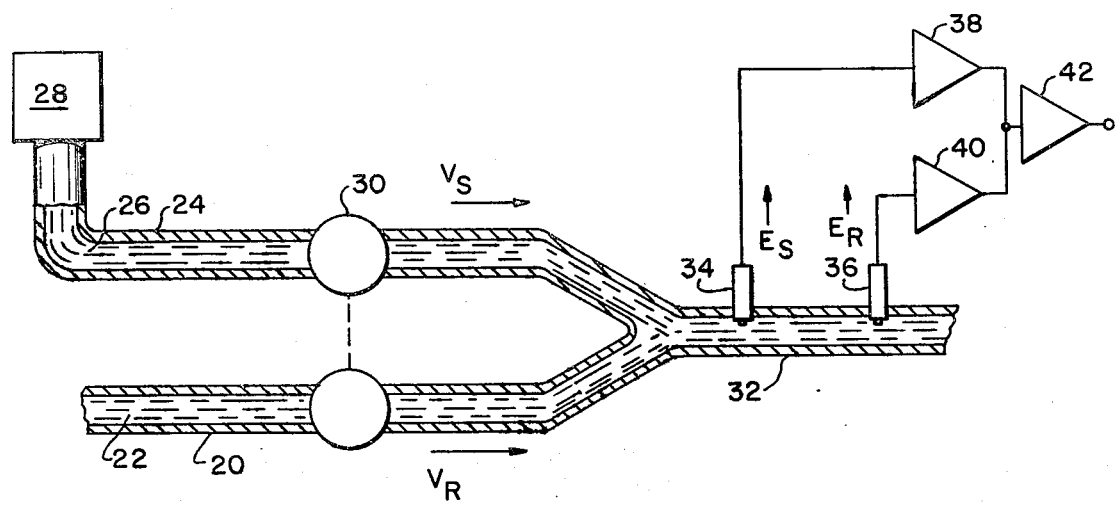

ELECTROCHEMICAL MEASURING SYSTEMS AND METHOD OF MEASURING IONIC STRENGTH IN A FLOW STREAM

This invention relates to electrochemical analytical systems, and more particularly to substantially continuous monitoring of fluid streams for ionic constituents with ionsensitive electrodes.

Generally, continuous monitoring systems using ionselective electrodes (including in the broadest sense, electrodes sensitive to hydrogen ion as well as electrodes sensitive to other ions), require a reference electrode. The reference electrode usually consists of a sensing element, such as a silver/silver chloride redox system or a mercury/mercurous chloride redox system, in contact with a reference solution of fixed composition. A liquid junction is then established between the reference solution and the sample solution so as to provide electrical continuity. The junction can be the source of many errors, since spurious potentials can be developed at this point, or the junction may become clogged after a period of time, especially in those designs using low leak rates. In addition the reference electrode requires periodic replacement, or the internal filling solution must be replenished periodically. The prior art contains numerous examples of attempts to design reference electrodes which minimize this group of problems.

In laboratory applications, such reference electrode problems have been reduced by the use of what are known as "cells without liquid junction": (see, for example, Ives and Janz, "Reference Electrodes," Academic Press, New York, (1961), page 9; or Ross, Science, 154, 1643 (1966), in which one series of measurements was made this way). Such cells have not been widely used in the past other than for rigorous thermodynamic measurements. An exception to this is the work by Manahan, Analytical Chemistry, 42, 128, 1970, who made nitrate measurements in a fixed background by adding a known amount of fluoride to all of his samples, and then used a nitrate sensitive electrode with a fluoride sensitive electrode in place of a reference electrode.

Obviously it is possible to substitute an ion sensing electrode for the reference electrode if an ion (other than the one being measured) is present in the sample stream at a constant level. If there is no ion present at a constant level in the sample, it is possible to add a constant level of a "tag" ion to the sample. One way this may be accomplished in a continuous monitor is to saturate the inlet water with a non-interfering ion, so that it may be used for reference purposes. For example, a water sample to be analyzed for chloride can be passed through a saturation tube packed with a sparingly soluble calcium salt like calcium fluoride and held at a constant temperature. If the sample composition remains reasonably well fixed, so that there are no larger variations in sample ionic strength, this procedure will provide a constant calcium activity, and a calcium electrode may be used as a reference electrode. In practice, the nature or composition of the sample can affect the solubility of the calcium salt, so the activity of calcium will vary. When this happens, the calcium electrode does not provide a stable reference potential.

A better method for introducing a tag ion is the use of a proportioning pump which allows the sample solution to be mixed at a known ratio with a reagent stream containing a tag ion. The output of the proportion pump is delivered to a pair of ion electrodes consisting of an electrode sensitive to the ion being measured, and an electrode sensitive to the tag ion.

In a great many of the applications of ion-sensitive electrodes, however, it is necessary to add a reagent which adjusts the sample composition in some manner. For example, it may be necessary to adjust the pH to an optimum range, or to remove some interfering ion. For examples in the literature of this kind of reagent, see the paper by Frant and Ross in Analytical Chemistry, Volume 40, page 1169, (1968), on the use of TISAB; or the paper by Frant and Ross in TAPPI, December 1970 on the use of the sulfide anti-oxidant buffer. The use of reagent additions in continuous monitoring is not new; Jacobson, Analytical Chemistry, Volume 38, 1951 (Dec. 1966) continuously added buffer to urine before measuring sodium and potassium. (He used a Na sensitive electrode to measure $Na^+$, and a $K^+$ sensitive electrode to measure $K^+$, and a common reference for both.) Indeed, one often needs to add a reagent solution to a flowing sample stream to reduce the effect of ions which would otherwise interfere with the continuous reading of the activity of the ions of interest.

The composition of the reagent stream can be chosen to provide both a tag ion and sample conditioning as described above.

The mixing of the sample and reagent streams introduces a problem. If the flow rate of either stream varies, the apparent concentration of the ion being measured may be in error. Even if the variation in flow rate is accurately known, calculations are required to determine the correct concentration of the ion being measured. In practice, it is very difficult to maintain a constant and exact ratio of flow rates. For example, with a peristaltic proportioning pump, tubing may vary in elasticity and diameter, back pressure due to head varies as the reagent is consumed, sample viscosity may change, or one channel may vary in temperature (and hence viscosity and density) independently of the other. With conventional check valve type pumps, leakage around the piston and check valves may be different in the pump and reagent channels. These problems are particularly severe in monitoring systems which operate with relatively small volumes and low flow rates.

A principal object of the present invention is to provide a system for monitoring with ion sensitive electrodes, which system is basically self-correcting for fluctuations in pumping rate, and wherein the output is substantially independent of reasonable variations in the respective flow rates of the sample and reagent streams. Generally, this object is effected by adding a known amount of a non-interfering tag ion to the sample stream, and sensing the difference in potential between an electrode responsive to the ion of interest and an electrode responsive to the tag ion, both electrodes being placed in the mixed stream. This system has the unique dual advantage of both compensating for pump variations, and of eliminating the need for a reference electrode. Another object is to provide such a system wherein minimization of temperature effects can readily be attained by adjustment of basic parameters of the system.

The term "flow rate" as used herein is intended to mean the volume of liquid passing a given point per unit of time.

Other objects of the invention will in part be obvious and will in part appear hereinafter. The invention accordingly comprises the apparatus possessing the construction, combination of elements, and arrangement of parts, and the process including the several steps and the relation of one or more of such steps with respect to each of the others, all of which are exemplified in the following detailed disclosure and the scope of the application of which will be indicated in the claims.

For a fuller understanding of the nature and objects of the present invention, reference should be had to the following detailed description taken in connection with the accompanying drawing wherein there is shown a schematic diagram of an embodiment of the present invention.

In the drawing there is shown a first conduit 20 for conveying a stream of fluid 22 containing the ionic species of interest and a second conduit 24 which is intended to convey a stream of fluid 26 containing a reagent or liquid having therein a species of "tag" ion of fixed and known activity. Reagent 26 can be supplied from reservoir 28. The supply of sample fluid 22 is not shown, but obviously can be obtained from any source, such as a process stream, the ionic activity of which is to be monitored.

The device includes pump means 30, in its preferred form, shown as a dual pump, capable of delivering to an output of reagent and sample streams preferably in an approximate or relatively fixed ratio of the pumped flow rates indicated as $V_S$ and $V_R$ of the sample and reagent streams respectively. Pump means 30 may be two pumps run at a constant rate or one pump may be arranged to run at a rate proportioned to the other. Pumping should be arranged to use as little reagent as practicable, typically in the order of 1 or 2 ml/minute.

In an alternative embodiment only one channel need be pumped, the other being gravity fed for example.

The electrodes most useful in the present invention are generally those which provide an electrical signal which is a function of the logarithm of the activity in the stream of the ionic species to which the electrode is sensitive, i.e. exhibit a response which is substantially according to the well-known Nernst equation. A large number of such electrodes are known and are described in detail in the literature, as for example in R. A. Durst "Ion-Selective Electrodes", National Bureau of Standards Special Publication 314, (1969).

The output of each electrode 34 and 36 is connected to respective amplifiers 38 and 40 of appropriate input impedance which amplifiers, as explained hereinafter, may be inverting or non-inverting depending on the choice of tag ion used. The amplifiers may have variable gain if desired.

One can assume that the reagent contains a fixed concentration R of tag ions which do not significantly interfere with the determination, and the sample contains a concentration S of the ionic species to be monitored. With respect to an arbitrary reference potential, then according to the Nernst equation:

$$(1) \quad E_s = B_S + \phi_S \log \frac{(q)}{(1+q)} + \phi_S \log S$$

and $$(2) \quad E_R = [B_R + \phi_R \log R] + \phi \log \frac{(1)}{(1+q)}$$

where $B_S$, $B_R$ are constants, $\phi_R$ and $\phi_S$ are the well-known values RT/nf of the respective Nernst equations, and q is equal to the ratio of sample flow rate to reagent flow rate, $V_S/V_R$.

If now one sets $\phi_R$ equal and opposite $\phi_S$ as by proper choice of the tag ion species, and feeds the two signals $E_S$ and $E_R$ into an algebraic summing device such as amplifier 42, the output signal $\Delta E$ of the latter will be (remembering that log R by definition is fixed)

$$(3) \quad E = \text{constant} + \phi_S \log \frac{(q)}{(q+1)^2} + \phi_S \log S$$

The second term varies with the flow rate ratio, q. However, for flow rates of sample and reagent which are approximately equal, variations in q have little effect on the measured potentials. For example, if q is equal to 1.00, and the electrode slope is 60 mv. then the second term will equal −36.12 mv. If q varied by 20 percent in one direction, so that it was equal to 1.20, then the second term would equal −36.30 mv. A table showing the effect of 20 percent and 40 percent variations in q from a value of 1.00 is given below:

| $q$ | $60 \log \frac{(q)}{(1+q)}$ in mv. |
|---|---|
| 1.40 | −36.84 |
| 1.20 | −36.30 |
| 1.00 | −36.12 |
| 0.80 | −36.42 |
| 0.60 | −37.68 |

From this table it is apparent that for flow rate ratios of about 1.00 ± 30 percent, the errors contributed by flow rate variation can be ignored when using the novel electrode arrangement discussed above. Since, electrodes which respond to monovalent ions have a nominal 60 mv slope, a variation of 30 percent in the flow rate ratio with this arrangement would introduce an error in the measurement of only 0.5 mv, or about ±2 percent of the reported level of the species being measured. The potential $\Delta E$ actually measured between the two electrodes, will substantially follow the Nernst equation.

4. $\Delta E \approx \text{constant} + \phi \log S$ where S is the concentration of the species of interest.

To achieve flow compensation as above noted, $\phi_R$ and $\phi_S$ should be set equal and opposite to one another by proper choice of tag ion species relative to the sample ion species. For example, if one sample ion is a monovalent cation, the tag ion should only be a monovalent anion, e.g. Na+ and Cl− respectively. Generally, one should choose a tag ion of the same total charge but of opposite polarity to the sample ion.

However, one can employ a wide variety of tag ions and achieve proper flow compensation through the electronics employed. For example, if the tag ion is the same polarity as the sample ion and even of different charge (e.g. tag ion is Cl− and sample ion is $Ca^{++}$) then to obtain a difference signal $\Delta E$, by summation, one can invert one of the signals as by an inverter, provided that the summing amplifier is connected to one of the streams by a conventional reference electrode. Further, where the slopes are different, one should provide a gain of two to the amplifier reading the signal responsive to the divalent ion in order to have the two signals track properly. Obviously one can employ a tag ion with a sample ion of the same polarity and charge (e.g. $Na^+$ and $K^+$) in which case, tracking can be achieved merely by inversion of one of the signals and summation of the two against a common reference electrode. While, in principle, one can use any pair of ionsensing electrodes to achieve flow compensation (provided that correct gains and senses are used in the respective electrode amplifiers), the need for a stable reference electrode can only be eliminated by employing a pair of electrodes which respond to ions of the same charge number but opposite sign. The following examples are illustrative of the flow compensation which can be achieved by the present invention.

EXAMPLE I

In order to show the magnitude of pump variations experienced with a commercially available peristaltic proportioned pump, a monitoring system for fluoride was built as follows:

An aqueous stream containing fluoride ion was taken up from a sample pool through one-sixteenth inch inside diameter Tygon tubing and passed through one channel 4-channel peristaltic pump. (Sage Instruments, Cambridge, Mass., Mod. No. 375).

A separate channel of the same pump drew a stream of reagent known as TISAB (1 M KCL, 1 M acetate/acetic acid pH buffer, and 1 g/l of a complexing agent for aluminum, CDTA) and this was mingled in a single conduit with the fluoride stream on a 1:1 ration by the pump. TISAB is used to fix the total ionic strength of the water at a uniformly high level, adjust the pH, and free fluoride from complexing agents. The mingled solution was then directed through a mixing chamber, which was formed of a small cylindrical section containing a magnetic stirrer, and thence into an electrode chamber. The electrode chamber contains two electrodes, a fluoride sensing electrode, and a chloride sensing electrode (respectively Model Nos. 94–09 and 94–17 Of Orion Research Incorporated, Cambridge, Mass.). From here, the mixed stream went to waste. Each electrode was connected to the high impedance input side of a digital pH meter (Orion Research Incorporated, Model No. 701).

This configuration, using two electrodes of like sign, is not flow compensating but in fact shows twice the flow sensitivity as a system employing a fluoride electrode and a conventional reference electrode.

For the purposes of this experiment, each meter served as a high input impedance, unity gain amplifier. In order to simplify the electronics, an ohmic connection was made to the mixed stream. The difference in output potential between the two meters was read out on a third similar meter.

The apparent stability of the electrode system itself was determined by starting up with the same solution in both channels.

The system was started up with the same solution in both channels: a mixture of equal parts by volume of TISAB and 1 ppm of KF. A bucking or bias potential was applied so that the difference between the pair read zero mv. Over a period of 10 to 15 minutes, the potential difference between the pair varied by about 0.3 mv.

Next, the system was run with TISAB in the reagent channel and various fluoride solutions in the other channel. The following potentials were observed:

| Sample Concentration | Observed Millivolts |
| --- | --- |
| 1 ppm | 0 mv |
| 2 ppm | 16.3 mv |
| 5 ppm | 42.0 mv |
| 10 ppm | 60.1 mv |

When the reagent consisted of TISAB, and the sample channel was 1 ppm fluoride, the observed potentials exhibited drifts of 1 to 2 millivolts over periods of 10 to 15 minutes, indicating pump variations of 2 – 4 percent. These variations are believed to be inherent in the use of flexible tubing and the nature of peristaltic pumps.

In the foregoing example, both tag and sample ions were of the same polarity and charge, which tends to exaggerate the effect of pump variations.

EXAMPLE II

The same physical arrangement was used as in the preceding example, except that the chloride electrode was replaced by an electrode responsive to sodium ions, so that the tag ion was of the same charge but of opposite polarity. The difference in potential between the two electrodes was set to zero when the sample was 1 ppm fluoride. The following calibration curve was obtained:

| Sample Concentration | Observed Millivolts |
| --- | --- |
| 1 ppm | 0 mv |
| 2 ppm | 17.2 mv |
| 5 ppm | 41.5 mv |
| 10 ppm | 58.0 mv |

While the calibration curve was similar to Example I (although showing somewhat less scatter), the stability of the system was improved. The fluctuation over a period of 15 – 30 minutes averaged between 0.2 and 0.3 mv.

To understand the reason for the flow compensation in the preceding example, it can be seen that when the reagent flow becomes greater than the sample flow, the effect normally would be to make the fluoride electrode potential more positive since there is less fluoride present. However, a decrease in the sample flow will cause an increase in the level of sodium in the mixed stream. This increase in sodium will result in an increasingly positive potential. To the extent that the increase in sodium activity equals the decrease in fluoride activity, the difference of potential between the electrodes will remain about the same.

EXAMPLE III

A similar system was constructed for monitoring sodium ion, using an iodide electrode (Model 94-53 of Orion Research Incorporated) and $10^{-2}$ molar potassium iodide as the reference standard or tag ion source in the reagent stream, which contained a buffer to keep the pH of the sodium sample between 9 and 10. Small fluctuations in the amount of buffer do not affect the final pH, but do affect the dilution of sodium and, hence the results. Use of an iodide tag compensates for variations which occurred as the reagent was used. Variations in pump rate were due to changes in reagent "head" (vertical distance between the solution stock bottle and the pump) as the reagent bottle was consumed, but were essentially compensated much as in Example II.

Not only does the system of the invention reduce the effect of flow rate on the monitored measurements but by either appropriate choice of the tag ion concentration or by adjusting the ratio of sample flow rate to reagent flow rate one can compensate the system for temperature effects.

It is well known that the potential provided by electrochemical electrodes of the type described is affected markedly by the temperature to which the ion-sensitive electrode is exposed, usually the temperature of the solution in which it is immersed. It can be shown that for the system hereinbefore described, compensation can be achieved by adjusting of either the concentration of tag ion of ratio of sample flow rate to reagent flow rate so that $$(4) \quad \frac{(V_R R)^{ns/nR}}{R_o^{ns/nR} (V_s + V_R)^{(ns/nR-1)}} = \frac{\overline{S}}{S_o}$$

Where $V_R$, $V_S$ and R have been defined in connection with equations 1-3, $R_o$ is the isopotential concentration for the tag-ion sensitive electrode.

So is the isopotential concentration for the electrode responsive to the sample ion, $\overline{S}$ is the desired isopotential sample concentration, and ns and nr are the charges (with sign) of the sample and tag ions respectively.

From this foregoing it can be further shown that optimum temperature compensation is achieved (assuming for example that both electrode exhibit Nernstian behavior) simply by employing a ratio, r, of flow rates such that $$(5) \quad r = \frac{V_s}{V_r} = -\frac{nr}{ns}$$

For example, if the sample ion is $Ca^{++}$ and the tag ion is $Br^-$, then the ratio of flow rates $r = 1/2$. Similarly if the sample ion is $Cl^-$ and the tag ion $Na^+$, the ratio of flow rates to achieve optimum temperature compensation should be 1/1.

Still another embodiment of this invention is compensation for evaporation losses in systems designed to monitor gaseous streams, such as in air pollution monitoring. A number of gaseous components, such as chloride or fluoride, present in the air as HCl or HF, can be monitored by ion electrodes. This can be done by contacting the gas with an aqueous solution and sensing the level of the ion which results from the dissolution of the pollutant into the aqueous phase.

Typical methods of contacting the polluted air with the aqueous reagent include the use of bubblers, scrubbers, and the like.

One problem that arises is the fact that the concentration of the ion of interest will tend to vary depending on the amount of evaporation which takes place in the process of contacting the gas with the reagent solution. If a tag ion is added to the reagent and an electrode pair of the same polarity and charge is used, similarly to the previous flow compensation examples above, then the system will be compensating for evaporative losses of water or other solvents from the reagent.

The reason for using electrodes of like polarity in this case can be seen from the following example: A scrubber is used to remove dilute HF from a known volume of air. In the process of scrubbing, about 50 percent of the scrubbing reagent is lost by evaporation. This amount varies depending on the relative humidity of the inlet air stream. If a known level of chloride is added as, for example, sodium chloride, to the reagent it will serve as a tag ion. As the water evaporates from the reagent, the fluoride level (for a given volume of air passed through the scrubber) will increase, but so will the level of chloride in nearly exact proportion. Because both electrodes show a proportionate increasingly negative potential with decreasing amounts of water, the difference in potential between the pair remains approximately constant.

What is claimed is:

1. Apparatus for electrochemical monitoring of a first ionic species of interest in a liquid flow stream comprising in combination:
    means for mixing said flow stream intimately into a second flow stream containing a second species of ion, at a substantially fixed concentration;
    a first electrochemical electrode for providing an electrical signal as a function of the activity of said first ionic species in said liquid; and
    a second electrochemical electrode for providing an electrical signal as a function of the activity of said second species of ion;
    both of said electrodes being disposed in operative contact with the mixture of said flow streams.

2. Apparatus as defined in claim 1 including means for determining a difference signal between the electrical signals from said electrodes.

3. Apparatus as defined in claim 2 wherein the ions of said first species are of the same charge and polarity as the ions of said second species.

4. Apparatus as defined in claim 2 wherein the ions of said first species are of the same charge as but opposite polarity as the ions of said second species and including means for inverting one of said electrical signals before determining said difference signal.

5. Apparatus as defined in claim 2 wherein the ions of said first species are of different charge than the ions of said second species and including means for amplifying one of said electrical signals by a factor proportional to the ratio of said charges before determining said difference signal.

6. Apparatus as defined in claim 1 including pump means for impelling both of said flow streams at an approximately fixed ratio of flow.

7. Apparatus as defined in claim 6 wherein said ratio is established in substantially inverse relation to the ionic charge of said species in said flows streams.

8. Apparatus as defined in claim 1 wherein said means for mixing comprises first and second conduits for conveying said first and second streams respectively, and meeting at a junction, and
    a third conduit for conveying the mixed flow streams from said junction, said electrodes being emplaced in said third conduit.

9. In continuous electrochemical monitoring of a first ionic species of interest in a liquid flow stream with an electrochemical electrode which provides an electrical signal responsively to the activity of said first species in said liquids, the method comprising mixing intimately with said stream at a point upstream from said electrode, a second stream of liquid containing substantially fixed concentration of a second species of ion, and detecting with a second electrode which provides an electrical signal responsively to said second species, the activity of said second species in the mixed flow stream.

10. Method as defined in claim 9 wherein said two species are of opposite polarities.

11. Method as defined in claim 9 wherein said two species bear respective charges of different magnitudes.

12. Method as defined in claim 9 wherein said two species bear respective charges of opposite polarity and different magnitudes.

13. Method as defined in claim 9 wherein said two species bear respective charges of the same polarity and magnitude.

14. Method as defined in claim 9 wherein said two species bear respective charges of the same magnitude.

15. Method as defined in claim 9 wherein said two species bear respective charges of the same polarity.

\* \* \* \* \*